United States Patent [19]

Otten et al.

[11] Patent Number: 5,131,216
[45] Date of Patent: Jul. 21, 1992

[54] DEVICE FOR SEPARATING THE SHOOT TIPS OF SUGAR-CANE PLANTS

[75] Inventors: Hillrich Otten, Harsewinkel; Egbert Paus, Borken, both of Fed. Rep. of Germany

[73] Assignee: Claas OHG, Harsewinkel, Fed. Rep. of Germany

[21] Appl. No.: 631,103

[22] Filed: Dec. 19, 1990

[30] Foreign Application Priority Data

Jan. 19, 1990 [DE] Fed. Rep. of Germany ....... 4001460

[51] Int. Cl.⁵ .............................................. A01D 45/10
[52] U.S. Cl. ............................................ 56/56; 56/63; 56/121.44
[58] Field of Search .................... 56/255, 63, 56, 119, 56/13.6, 13.7, 14.3, 121.44, 121.45, 16.4

[56] References Cited

U.S. PATENT DOCUMENTS

| | | | |
|---|---|---|---|
| 3,398,515 | 8/1968 | Ash | 56/63 |
| 3,448,564 | 6/1969 | Chauffe | 56/14.3 |
| 3,462,927 | 8/1969 | Quick | 56/56 |
| 3,596,447 | 8/1971 | Makeham et al. | 56/63 |
| 3,596,448 | 8/1971 | Van Buskirk | 56/63 |
| 3,705,481 | 12/1972 | Willett | 56/13.9 |
| 3,760,569 | 9/1973 | Willett | 56/10.7 |
| 4,272,947 | 6/1981 | Mizzi | 56/63 |

FOREIGN PATENT DOCUMENTS

| | | |
|---|---|---|
| 436344 | 10/1970 | Australia . |
| 2418995 | 11/1975 | Fed. Rep. of Germany . |
| 3606030 | 8/1986 | Fed. Rep. of Germany . |

*Primary Examiner*—Terry Lee Melius
*Attorney, Agent, or Firm*—Spencer, Frank & Schneider

[57] ABSTRACT

A device for separating the shoot tips of sugar-cane plants for multi-row sugar-cane harvesting machines. The device includes feed-and-cutting-elements mounted in front of a trough-like table having a cross-conveyor worm which receives the tip portions and conveys them to the side. The feed-and-cutting-elements have two feed discs equipped with prongs which interact respectively with a respective cutting disc.

7 Claims, 3 Drawing Sheets

DEVICE FOR SEPARATING THE SHOOT TIPS OF SUGAR-CANE PLANTS

BACKGROUND OF THE INVENTION

1. Field of the Invention

The invention relates to a device for separating the shoot tips of sugar-cane plants for multi-row sugar-cane harvesting machines.

2. Background Information

There is no good reason for recovering the plant tips of sugar-cane plants because of their low sugar content, and they would simply obstruct the wind-cleaning zone for the chopped sugar-containing cane portions.

A device of this type, a so-called "topper", is known from U.S. Pat. No. 3,760,569. This device consists of an inclined plate which projects from the machine frame at an appropriate height and on the underside of which are mounted two pairs of rotating knife blades. These comminute the plant tips and scatter the fragments on all sides, even into the stock still standing, this being undesirable.

A two-row topper is also known from U.S. Pat. No. 3,705,481. In this, the plant tips are not comminuted, but are each cut off by a cutting disc. Endless pronged chains arranged in a V-shaped manner serve as feed arrangements. This device is placed directly onto the V-shaped cutting fore-structure of the harvester. The plant tips are thus cut off only when the plant as a whole has already been detached from the root and picked up by the harvester. A transporting away of the cut-off shoot tips is not described. They obviously fall individually onto the ground surface already cropped in this instance and the machine drives over them.

U.S. Pat. No. 3,596,447 makes known a topper for a plant row, which works with two interacting cutting discs and with two endless delivery chains arranged in a V-shaped manner. The cutting discs carry superstructures in the form of hollow cylinders, each with six radial bars which are attached in a star-shaped manner and which convey the cut-off plant tips rearwards.

Finally, U.S. Pat. No. 3,462,927 shows a topper for a single-row machine, two interacting pronged discs being provided as a delivery arrangement and the cutting arrangement being a disc which is equipped with triangular knives on the circumference and which overlaps the pronged discs.

SUMMARY OF THE INVENTION

An object of the invention is to provide a simple and operationally reliable device of a type designated in the introduction, which deposits the tip portions of at least two plant rows on cropped ground in an orderly manner.

According to the invention, this object is achieved in that feed and cutting elements are mounted in front of a trough-like table having a cross-conveyor worm which receives the tip portions and conveys them to the side. In the cross-conveyor worm which is of suitably large volume, the plant portions of the two rows are brought together and at the end of the worm are deposited in a common swath, specifically on that side of the vehicle located opposite the standing stock.

According to an expedient embodiment of the invention, for each plant row there is a feed and cutting arrangement consisting of two oppositely rotating feed discs equipped with prongs on the circumference thereof and a cutting disc interacting with these. The horizontal distance between entry gussets of the feed discs corresponds to the plant-row spacing, and the mutually adjacent feed discs of the various feed and cutting arrangements overlap one another. The individual discs are preferably each driven from below by means of an individual hydraulic motor. In order to guide the standing docked sugar plants unimpeded past the drive motors of the cutting discs, it is proposed that the axis of the cutting disc should extend at a distance from, that is, be offset from, the plane of symmetry of the associated feed discs.

So that the feed arrangements can be matched to the varying harvesting conditions, it is further proposed that the feed discs, together with their hydraulic motors, be adjustable in the direction of travel on their supporting structure. The centre distance between the feed discs, and their centre distance from the knife disc, can thereby be varied.

To assist the transfer of the cut-off stalk tips in the direction of the cross-conveyor worm, it is advantageous if axially symmetrical co-rotating super-structures are fastened on the feed and/or cutting discs. Between these superstructures are formed conveying lanes, in which the stalk tips move further, essentially in a standing posture.

An expedient trough-like table has a planar front edge part extending and engaging under the cutting discs and is bent upwards at its rear part so as to follow the outer circumference of the cross-conveyor worm. Although the table's surface is thereby matched to the worm over only a quarter of its circumference, this ensures a sufficient conveying capacity and on the other hand prevents the worm from being clogged by the sometimes very long stalk portions and their foliage. At least that bearing of the cross-conveyor worm located on the discharge side is preferably held suspended on an arm, so that the conveyed material can be discharged unimpeded on the end face of the worm.

BRIEF DESCRIPTION OF THE DRAWINGS

An example of the an embodiment of the invention is explained below by means of the drawings. In particular, in the drawings.

DETAILED DESCRIPTION OF THE PREFERRED EMBODIMENT

Figure 1:
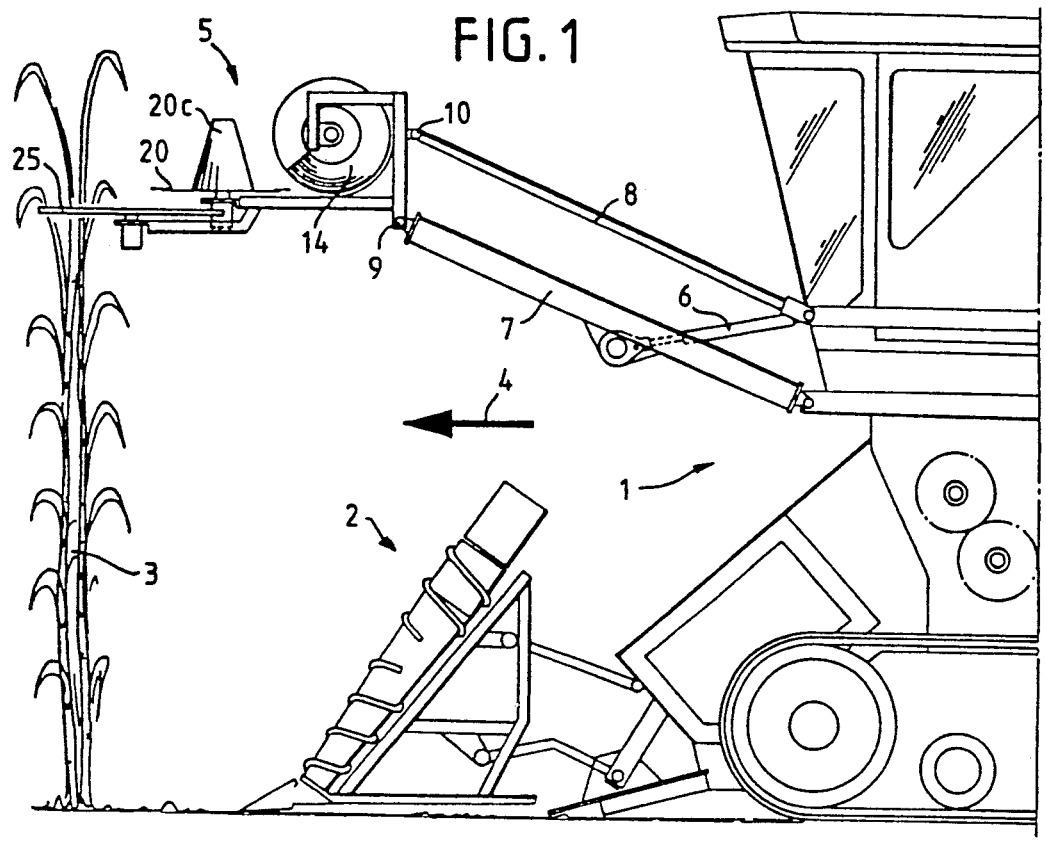
FIG. 1 shows a side view of the front part of a sugar-cane harvester with a device for cutting off the stalk tip of the sugar-cane plants according to the invention.

According to FIG. 1, a sugar-cane harvester mounted on a crawler truck is designated by 1. Only the front part with the attached cutting unit 2 is shown. The sugar-cane plants 3, of which one is shown as an example, stand in mutually parallel plant rows extending in the direction of travel 4. Both the cutting unit 2 which cuts off the plant stalks at the bottom and the cutting-off device 5 for the stalk tips, which is to be described below, process two plant rows simultaneously. The mount of the device 5 is attached to the machine frame by means of a parallel lever system so as to project forwards above the cutting unit 2. By adjusting a hydraulic working cylinder 6 articulated on the machine frame on the one hand and on a lower parallel lever 7 on the other hand, the height of the device can be varied by approximately 1 and 4 m. In contrast to the lower parallel levers 7, the upper parallel levers 8 are telescopic, so that the inclination of the device 5 can also be adjusted in this way. The parallel levers 7 and 8 are articulated at 9 and 10 on the rear part of the mount of the device 5.

Figure 2:
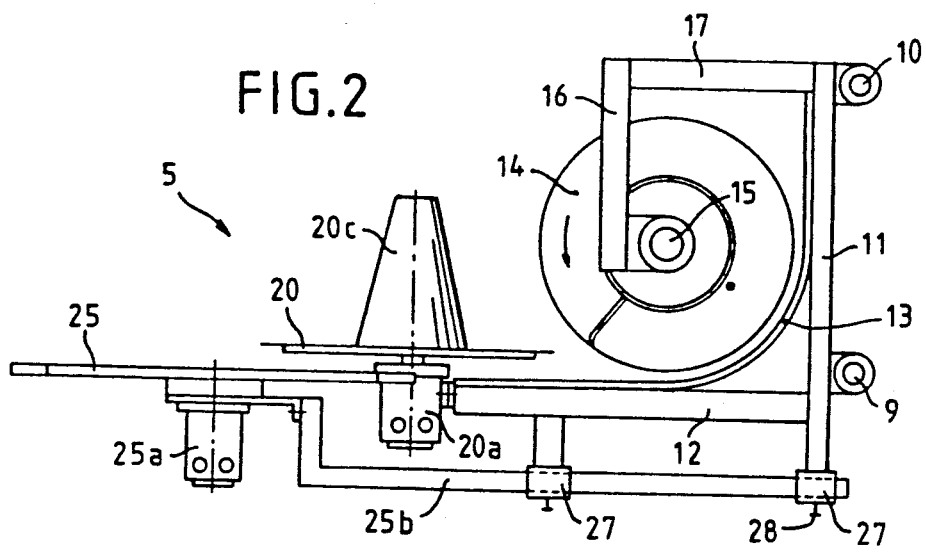
FIG. 2 shows a side view of the cutting device according to FIG. 1 on a larger scale.
Figure 3:
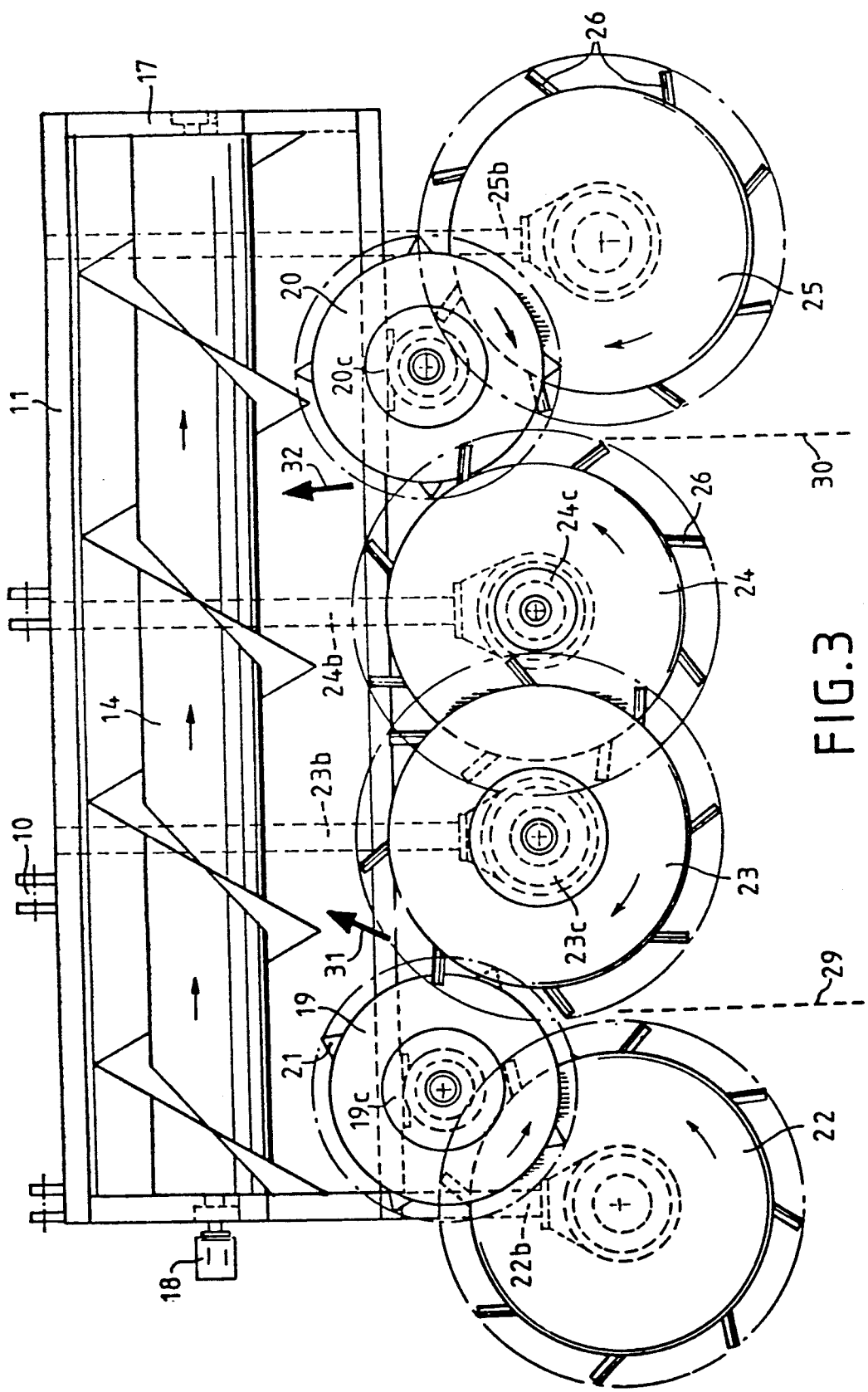
FIG. 3 shows a top view of the device according to FIG. 2.

As shown in FIGS. 1 to 3, this mount consists of two rectangular flat frames 11 and 12 which are connected firmly to one another to form an angular structure, the frame 12 being horizontal and the frame 11 vertical. The articulation lugs 9 and 10 for the parallel levers are also attached to the vertical frame 11. The frames are covered with a metal sheet 13 (especially FIG. 2) which starts at the left edge of the horizontal frame 12, is then curved upwards in the form of an arc of a circle and extends as a rear wall as far as the upper edge of the vertical frame 11. Arranged in the throat or trough so formed is a conveyor worm 14, the axis of which extends horizontally and tranversely relative to the direction of travel 4. On the end face confronting the observer according to FIG. 2, the bearing 15 of the worm is fastened to the lower end of the vertical leg 16 of an angle support, the horizontal leg 17 of which is firmly attached to the vertical frame 11. The end face of that end portion of the worm 14 located on the right, as seen from the front, is therefore largely free. At the opposite end is located a hydraulic motor 18 for driving the worm. The direction of rotation is so selected according to the arrows indicated that the conveyed material comes out at the free end described.

Figure 4:
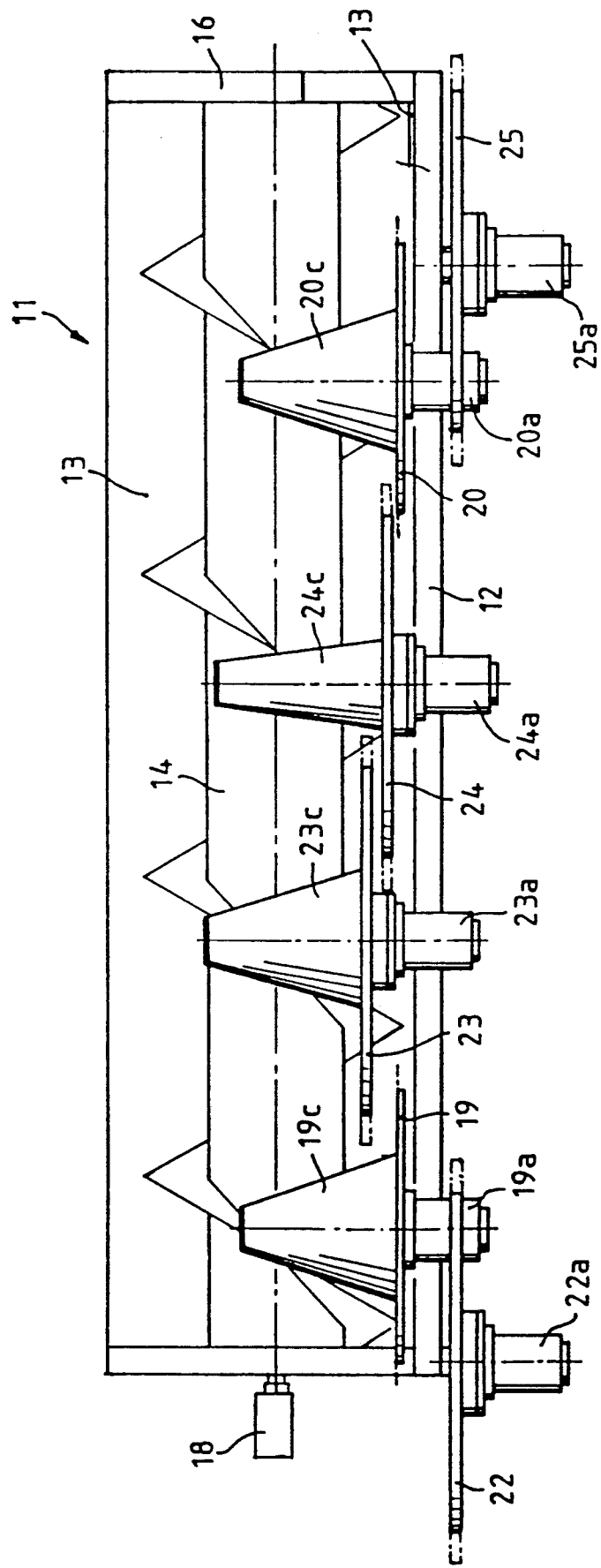
FIG. 4 shows a front view of the device according to FIG. 2.

Hydraulic motors 19a and 20a at vertical axes of two cutting discs 19 and 20 are fastened to the front edge of the horizontal frame 12. These cutting discs 19 and 20 extend a short distance over the front edge of the table formed by the metal sheet 13 and the horizontal frame 12. The circumference of each cutting disc is equipped with a plurality of triangular knives 21. Each of the two cutting discs 19 and 20 interacts with two feed discs 22, 23 and 24, 25. These feed discs have a larger diameter than the cutting discs and are each equipped on the circumference with prongs 26 inclined rearwards in relation to the direction of rotation indicated by the arrows. These horizontally arranged feed discs 22 to 25 are likewise driven from below by means of hydraulic motors 22a to 25a. These motors are held on horizontally extending rods 22b to 25b and are consequently adjustable forwards and backwards in the direction of travel. Attached under the horizontal frame 12 are sleeves 27, in which these rods are inserted and retained by means of clamping screws 28 (see FIG. 2). The distance between the respective interacting feed discs is selected so that the running circles of the prong tips approximately touch one another or are at a slight distance from one another. In contrast, the mutually adjacent feed discs 23 and 24 of the two working arrangements overlap. Furthermore, the feed discs overlap the cutting disc assigned to them. The height of the individual discs can be seen from FIG. 4. According to this, the respective cutting disc is located between the associated feed discs. The discs 19, 20, 23 and 24 are equipped on their top side with coaxial conveying cones 19c to 24c.

The operating mode of the device can best be described by reference to FIG. 3. Broken lines 29 and 30 indicate the plant rows. The motors of the cutting discs 19 and 20 are deliberately arranged laterally in relation to these plant planes, so that the forward movement of the device allows the plant stalks topped by the cutting discs to pass through virtually unimpeded. Above the cutting discs, these, the feed discs and the conveying cones form two conveying zones which are indicated by arrows 31 and 32.

We claim:

1. A device for separating the shoot tips of sugar cane plants for a multi-row sugar-cane harvesting machine, the device having a supporting structure which is vertically adjustable and inclinably mounted on a frame of the harvesting machine by a linkage, the device being operated in front of, in the direction of travel of the harvesting machine, a cutting unit of the harvesting machine which separates plant stalks from roots, the device comprising:

a plurality of feed-and-cutting-element means disposed on the supporting structure, one for each row of plants to be harvested, each of said feed-and-cutting-element means including two oppositely rotating feed discs equipped with prongs and a cutting disc interacting with the feed discs, mutually adjacent feed discs of the plurality of feed-and-cutting-element means overlapping one another, a respective pair of feed discs feeding plant tips to a respective cutting disc for cutting, said feed-and-cutting-element means thereby producing tip segments; and a transverse feed worm provided with a trough shaped table, the feed worm receiving tip segments from the feed-and-cutting-element means and conveying them to a discharge end at a side of the device, the feed worm and table being mounted on the supporting structure behind, in the direction of travel of the harvesting machine, the plurality of feed-and-cutting-element means.

2. The device according to claim 1, wherein an axis of a respective cutting disc is offset from a plane of symmetry of the respective associated feed discs.

3. The device according to claim 1, wherein each of the feed discs is adjustably mounted on the supporting structure so that axes thereof are adjustable with respect to associated cutting discs and with respect to the other feed discs on the supporting structure.

4. The device according to claim 1, wherein axially symmetrical co-rotating members are fixedly mounted on a top surface of at least one of the feed and cutting discs.

5. The device according to claim 1, wherein the trough shaped table has a planar front edge part extending under the cutting discs and is curved upwards at a rear part so as to follow an outer circumference of the feed worm.

6. The device according to claim 1, wherein the supporting structure includes an arm having at least one bearing for rotatably suspending an end of the feed worm, the arm being located on the discharge end of the feed worm.

7. A device for separating the shoot tips of sugar cane plants for attachment to a multi-row sugar-cane harvesting machine comprising:

a supporting frame having means for adjustable attachment to a harvesting machine;

feeding and cutting means mounted to said supporting frame at a front portion of said supporting frame, for feeding and cutting tips of the sugar cane plants to provide tip segments at an output thereof, the feeding and cutting means including at least one arrangement of a cutting disc and a pair of feeding discs, the feeding discs of an arrangement rotating in opposite directions, the feeding discs of an arrangement being displaced vertically with respect to the associated cutting disc of the arrangement and overlapping radially the associated cutting disc of the arrangement, edges of feeding discs in each arrangement forming an entry gusset therebetween, the feeding discs being provided with prongs which transport the sugar cane tips through the entry gusset to a respective cutting disk of the arrangement, an axis of the cutting disc of an arrangement being laterally offset from the entry gusset, the feeding discs and the cutting disc of an arrangement having axial driving means for rotation thereof, the driving means of a feeding disc being mounted on an adjustable member attached to the supporting frame so that the position of a respective feeding disc can be selectively adjusted with respect to another feeding disc and with respect to an associated cutting disc, at least each cutting disc being provided with an axially disposed cone shaped transporting member on an upper surface thereof for transporting the tip segments to the output;

a transverse feed worm rotatably suspended at a first end thereof by a vertical arm of said supporting frame and at a second end thereof by a driving means for rotating the feed worm, said feed worm being disposed at a rear portion of said supporting frame, said feed worm for receiving the tip segments output from said feeding and cutting means and for transporting them to a discharge end of the feed worm, said discharge end corresponding to the end suspended by said vertical arm and being at a side of said device; and a trough shaped table fixedly mounted to said supporting frame, a planar front portion of the table extending under a portion of the at least one arrangement cutting disc, a curved rear portion of the table extending under and partially around said feed worm thereby at least partially enclosing a bottom and rear portion of said feed worm.

* * * * *